(12) United States Patent
Kindl et al.

(10) Patent No.: US 10,465,598 B2
(45) Date of Patent: Nov. 5, 2019

(54) INTERNAL COMBUSTION ENGINE WITH EXHAUST-GAS TURBOCHARGING ARRANGEMENT

(71) Applicant: Ford Global Technologies, LLC, Dearborn, MI (US)

(72) Inventors: Helmut Matthias Kindl, Aachen (DE); Hanno Friederichs, Aachen (DE); Joerg Kemmerling, Monschau (DE); Vanco Smiljanovski, Bedburg (DE); Andreas Kuske, Geulle (NL); Franz Arnd Sommerhoff, Aachen (DE)

(73) Assignee: Ford Global Technologies, LLC, Dearborn, MI (US)

(*) Notice: Subject to any disclaimer, the term of this patent is extended or adjusted under 35 U.S.C. 154(b) by 192 days.

(21) Appl. No.: 15/647,002

(22) Filed: Jul. 11, 2017

(65) Prior Publication Data
US 2018/0023461 A1 Jan. 25, 2018

(30) Foreign Application Priority Data
Jul. 21, 2016 (DE) ........................ 10 2016 213 386

(51) Int. Cl.
*F02B 37/18* (2006.01)
*F01N 13/10* (2010.01)
*F01D 17/10* (2006.01)

(52) U.S. Cl.
CPC .......... *F02B 37/183* (2013.01); *F01D 17/105* (2013.01); *F05D 2220/40* (2013.01); *F05D 2260/231* (2013.01); *Y02T 10/144* (2013.01)

(58) Field of Classification Search
CPC .. F02B 37/183; F01D 17/105; F05D 2220/40; F05D 2260/231; Y02T 10/144
USPC ................................. 60/602, 605.1, 320–323
See application file for complete search history.

(56) References Cited

U.S. PATENT DOCUMENTS

| | | | | |
|---|---|---|---|---|
| 3,948,052 A | * | 4/1976 | Merkle | F01N 3/046 60/321 |
| 4,034,723 A | * | 7/1977 | Hamparian | F02B 77/02 123/41.76 |
| 4,046,114 A | * | 9/1977 | Hamparian | F02B 77/02 123/41.76 |
| 4,914,911 A | * | 4/1990 | Bertram | F01N 13/08 60/313 |
| 5,170,557 A | * | 12/1992 | Rigsby | F01N 13/141 138/148 |
| 5,277,026 A | * | 1/1994 | Boll | F01N 3/2006 60/288 |

(Continued)

FOREIGN PATENT DOCUMENTS

| | | |
|---|---|---|
| DE | 4342572 C1 | 11/1994 |
| DE | 10307028 B3 | 5/2004 |

(Continued)

*Primary Examiner* — Thai Ba Trieu
(74) *Attorney, Agent, or Firm* — Geoffrey Brumbaugh; McCoy Russell LLP (57) ABSTRACT

Systems and methods for operating an engine that includes a cavity in an exhaust manifold of a turbocharged engine are described. The systems and methods may improve engine efficiency and provide a way of controlling temperatures of engine exhaust components. The cavity may be located between an exterior wall of the exhaust manifold and an interior wall of the exhaust manifold.

17 Claims, 4 Drawing Sheets

(56) References Cited

U.S. PATENT DOCUMENTS

| | | | | |
|---|---|---|---|---|
| 5,463,867 | A | * | 11/1995 | Ruetz .................... F01N 13/102 60/321 |
| 5,706,655 | A | * | 1/1998 | Kojima ................ F01N 13/102 60/322 |
| 5,907,134 | A | | 5/1999 | Nording et al. |
| 6,523,343 | B2 | | 2/2003 | Durr et al. |
| 7,434,390 | B2 | | 10/2008 | Nording et al. |
| 7,807,120 | B2 | * | 10/2010 | Hansen ................ F01N 3/2889 60/300 |
| 8,312,721 | B2 | | 11/2012 | Smatloch et al. |
| 2012/0104745 | A1 | * | 5/2012 | Story ...................... F02B 37/18 285/133.11 |
| 2017/0211419 | A1 | * | 7/2017 | Kuhlbach ............. F01D 25/125 |

FOREIGN PATENT DOCUMENTS

| | | | | |
|---|---|---|---|---|
| DE | 102014018318 | A1 | | 6/2015 |
| EP | 2112345 | A2 | * | 10/2009 ........... F01N 13/102 |
| FR | 2919209 | A1 | * | 1/2009 ........... F01N 13/102 |
| FR | 2919210 | A1 | * | 1/2009 ........... F01N 13/102 |
| JP | 60145422 | A | * | 7/1985 ........... F01N 13/102 |
| JP | 2004084480 | A | * | 3/2004 ........... F01N 3/046 |

\* cited by examiner

INTERNAL COMBUSTION ENGINE WITH EXHAUST-GAS TURBOCHARGING ARRANGEMENT

CROSS REFERENCE TO RELATED APPLICATION

The present application claims priority to German Patent Application No. 102016213386.1, filed Jul. 21, 2016. The entire contents of the above-referenced application are hereby incorporated by reference in its entirety for all purposes.

FIELD

The present description relates to methods and a system for operating a turbocharged engine. The methods and systems may be particularly useful for reducing engine cold starting emissions and reducing engine exhaust backpressure at higher engine loads.

BACKGROUND AND SUMMARY

An internal combustion engine of the type mentioned in the introduction is used for example as a motor vehicle drive unit. Within the context of the present invention, the expression "internal combustion engine" encompasses Otto-cycle engines, diesel engines and also hybrid internal combustion engines, which utilize a hybrid combustion process, and also hybrid drives which comprise not only the internal combustion engine but also an electric machine which can be connected in terms of drive to the internal combustion engine and which receives power from the internal combustion engine or which, as a switchable auxiliary drive, additionally outputs power.

Supercharging of an internal combustion engine serves primarily for increasing power. The air required for the combustion process is compressed, as a result of which a greater air mass can be supplied to each cylinder per working cycle. In this way, the fuel mass and therefore the mean pressure can be increased.

Supercharging is a suitable means for increasing the power of an internal combustion engine while maintaining an unchanged swept volume, or for reducing the swept volume while maintaining the same power. In any case, supercharging leads to an increase in volumetric power output and a more expedient power-to-weight ratio. If the swept volume is reduced, it is possible to shift the load collective toward higher loads, at which the specific fuel consumption is lower. By means of supercharging in combination with a suitable transmission configuration, it is also possible to realize so-called downspeeding, with which it is likewise possible to achieve a lower specific fuel consumption.

Supercharging consequently assists in the constant efforts in the development of internal combustion engines to minimize fuel consumption, that is to say to improve the efficiency of the internal combustion engine.

For supercharging, use is generally made of an exhaust-gas turbocharger, in which a compressor and a turbine are arranged on the same shaft. The hot exhaust-gas flow is supplied to the turbine and expands in the turbine with a release of energy, as a result of which the shaft is set in rotation. The energy supplied by the exhaust-gas flow to the turbine and ultimately to the shaft is used for driving the compressor which is likewise arranged on the shaft. The compressor conveys and compresses the charge air fed to it, as a result of which supercharging of the cylinders is obtained. A charge-air cooling arrangement may additionally be provided, by means of which the compressed charge air is cooled before it enters the cylinders.

The advantage of an exhaust-gas turbocharger for example in comparison with a mechanical charger is that no mechanical connection for transmitting power exists or is required between the charger and internal combustion engine; such a mechanical connection takes up additional structural space in the engine bay and has a not inconsiderable influence on the arrangement of the assemblies. While a mechanical charger extracts the energy required for driving it entirely from the internal combustion engine, and thereby reduces the output power and consequently adversely affects the efficiency, the exhaust-gas turbocharger utilizes the exhaust-gas energy of the hot exhaust gases.

Problems are encountered in the configuration of the exhaust-gas turbocharging, wherein it is basically sought to obtain a noticeable performance increase in all engine speed ranges. In the case of internal combustion engines supercharged by way of an exhaust-gas turbocharger, a noticeable torque drop is observed when a certain engine speed is undershot. The effect is undesirable and is one of the most severe disadvantages of exhaust-gas turbocharging.

The torque drop is understandable if one takes into consideration that the charge pressure ratio is dependent on the turbine pressure ratio. If, for example, the engine speed is reduced, this leads to a smaller exhaust-gas flow and therefore to a lower turbine pressure ratio. This has the effect that, toward lower engine speeds, the charge pressure ratio likewise decreases, which equates to a torque drop.

In the prior art, it is sought, using a variety of measures, to improve the torque characteristic of an exhaust gas-turbocharged internal combustion engine.

One such measure, for example, is a small design of the turbine cross section and simultaneous provision of an exhaust-gas blow-off facility. Such a turbine is also referred to as a wastegate turbine. If the exhaust-gas mass flow exceeds a critical value, a part of the exhaust-gas flow is, within the course of a so-called exhaust-gas blow-off, conducted via a bypass line past the turbine. The approach has the disadvantage that the supercharging behavior is inadequate at relatively high engine speeds.

The torque characteristic of a supercharged internal combustion engine may furthermore be improved by means of multiple turbochargers arranged in parallel, that is to say by means of multiple turbines of relatively small turbine cross section arranged in parallel, turbines being activated successively with increasing exhaust-gas flow rate, similarly to sequential supercharging.

The torque characteristic may also be advantageously influenced by means of multiple exhaust-gas turbochargers connected in series. By connecting two exhaust-gas turbochargers in series, of which one exhaust-gas turbocharger serves as a high-pressure stage and one exhaust-gas turbocharger serves as a low-pressure stage, the compressor characteristic map can advantageously be expanded, specifically both in the direction of smaller compressor flows and also in the direction of larger compressor flows.

In particular, with the exhaust-gas turbocharger which serves as a high-pressure stage, it is possible for the surge limit to be shifted in the direction of smaller compressor flows, as a result of which high charge pressure ratios can be obtained even with small compressor flows and the torque characteristic in the lower engine speed range is considerably improved. This is achieved by designing the high-pressure turbine for small exhaust-gas flows and by providing a bypass line by means of which, with increasing exhaust-gas flow, an increasing amount of exhaust gas is conducted past the high-pressure turbine. For this purpose, the bypass line branches off from the exhaust-gas discharge system upstream of the high-pressure turbine and opens into the exhaust-gas discharge system again upstream of the low-pressure turbine. In the bypass line there is arranged a shut-off element for controlling the exhaust-gas flow conducted past the high-pressure turbine.

The internal combustion engine to which the present invention relates has at least one exhaust-gas turbocharger, the turbine, which comprises a turbine housing, of the at least one exhaust-gas turbocharger being a wastegate turbine. According to the prior art, the exhaust lines which adjoin the outlet openings of the at least two cylinders are at least partially integrated in the cylinder head and are merged to form a common overall exhaust line or merged in groups to form two or more overall exhaust lines. The merging of exhaust lines to form an overall exhaust line is referred to generally, and within the context of the present invention, as an exhaust manifold.

With regard to the configuration of the exhaust-gas turbocharging, it is sought to arrange the turbine or turbines as close as possible to the outlet of the internal combustion engine, that is to say close to the outlet openings of the cylinders, in order thereby to be able to make optimum use of the exhaust-gas enthalpy of the hot exhaust gases, which is determined significantly by the exhaust-gas pressure and the exhaust-gas temperature, and to ensure a fast response behavior of the turbocharger. A close-coupled arrangement not only shortens the path of the hot exhaust gases to the turbine but also reduces the volume of the exhaust-gas discharge system upstream of the turbine. The thermal inertia of the exhaust-gas discharge system likewise decreases, specifically owing to a reduction in the mass and length of the part of the exhaust-gas discharge system leading to the turbine.

For the reasons stated above, a turbine is generally arranged at the outlet side on the cylinder head, and the exhaust manifold is commonly integrated in the cylinder head. The integration of the exhaust manifold additionally permits dense packaging of the drive unit. Furthermore, the exhaust manifold can benefit from a liquid-type cooling arrangement that may be provided in the cylinder head, such that the manifold does not need to be manufactured from materials that can be subject to high thermal load, which are expensive.

The close-coupled arrangement of a turbine also enables the exhaust-gas aftertreatment arrangement to be arranged close to the outlet of the internal combustion engine. This offers advantages in particular after a cold start or in the warm-up phase of the internal combustion engine, because the path of the hot exhaust gases to the exhaust-gas aftertreatment systems is short or shortened. In this way, an exhaust-gas aftertreatment system reaches its light-off temperature or operating temperature more quickly after a cold start or in the warm-up phase.

The prior art also discloses other or additional measures for supplying exhaust gas at as high a temperature as possible to a turbine arranged in the exhaust-gas discharge system or to an exhaust-gas aftertreatment system provided in the exhaust-gas discharge system.

The exhaust-gas discharge system upstream of the turbine, that is to say an exhaust manifold or an overall exhaust line, may be equipped with thermal insulation, which counteracts cooling of the exhaust gas as it flows through the manifold or the overall exhaust line on the path to the turbine. The insulation serves as a barrier which impedes or hinders the extraction of heat from the exhaust gas.

A disadvantage of permanently acting thermal insulation is that the components provided in the exhaust-gas discharge system, and the exhaust-gas discharge system itself, are themselves subjected to high thermal load by the hot exhaust gas. This may lead to thermal overloading in particular at high loads and at full load.

To prevent thermal overloading of individual components of the internal combustion engine, according to the prior art, an enrichment ($\lambda<1$) is in some cases performed if high exhaust-gas temperatures are to be expected. Here, more fuel is injected than can actually be burned with the provided air quantity, with the excess fuel likewise being heated and evaporated, such that the temperature of the combustion gases falls. The approach is duly considered to be disadvantageous from energy-related aspects, in particular with regard to the fuel consumption of the internal combustion engine, and with regard to pollutant emissions, but is nevertheless recognized as being admissible and expedient for achieving the aim.

The exhaust-gas temperatures may basically also be reduced by means of a leaning ($\lambda>1$) of the fuel/air mixture. The effect is similar to that during an enrichment. Whereas too much fuel is injected during the enrichment, it is the case during a leaning that less fuel is injected than could be burned with the provided air quantity, that is to say more air is provided than is required for the combustion of the fuel, wherein the excess air participates in the combustion process, that is to say is jointly heated. The temperature of the combustion gases is reduced in this way. The temperature reduction as a result of leaning is considerably less pronounced than that during an enrichment because, by contrast to the excess fuel, the excess air does not need to be evaporated.

Against this background, it is an object of the present invention to provide a supercharged internal combustion engine, by means of which the disadvantages known from the prior art are eliminated and the operating behavior of which is improved.

The inventors herein have recognized the above-mentioned issues and have developed a supercharged internal combustion engine having at least two cylinders, having an intake system for the supply of charge air, and having an exhaust-gas discharge system for the discharge of exhaust gas and having at least one exhaust-gas turbocharger which comprises a turbine arranged in the exhaust-gas discharge system and a compressor arranged in the intake system, in which each cylinder of the internal combustion engine has at least one outlet opening for the discharge of the exhaust gases via the exhaust-gas discharge system, and each outlet opening is adjoined by an exhaust line, the exhaust lines of at least two cylinders merging to form an overall exhaust line, thus forming an exhaust manifold, and the turbine, which comprises a turbine housing, of the at least one exhaust-gas turbocharger is a wastegate turbine, and which internal combustion engine is distinguished by the fact that the exhaust-gas discharge system is equipped at least in regions with at least one cavity which can be used as thermal insulation, the at least one cavity forming a bypass which is at least connectable to the exhaust-gas discharge system upstream and downstream of the wastegate turbine and which is equipped with at least one shut-off element (e.g., a bypass valve).

By selectively flowing exhaust gas through a cavity in an exhaust manifold, it may be possible to provide the technical result of reducing engine emissions during engine starting and bypassing a turbocharger turbine at higher engine temperatures to reduce temperature increases of engine components. For example, holding exhaust gases in an outer cavity of an exhaust manifold during engine starting may improve heat retention in an engine exhaust system so that emissions devices in the exhaust system reach operating temperature sooner. Further, by allowing exhaust gases to enter the cavity and flow through the cavity, exhaust energy may bypass the turbocharger to reduce turbine temperatures as compared to if all the engine's exhaust flowed through the turbine.

The present description may provide several advantages. Specifically, the system may reduce engine starting emissions. In addition, the system may reduce the possibility of degrading heat sensitive engine components. Further, the system may be operated according to vehicle conditions to improve system operation.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
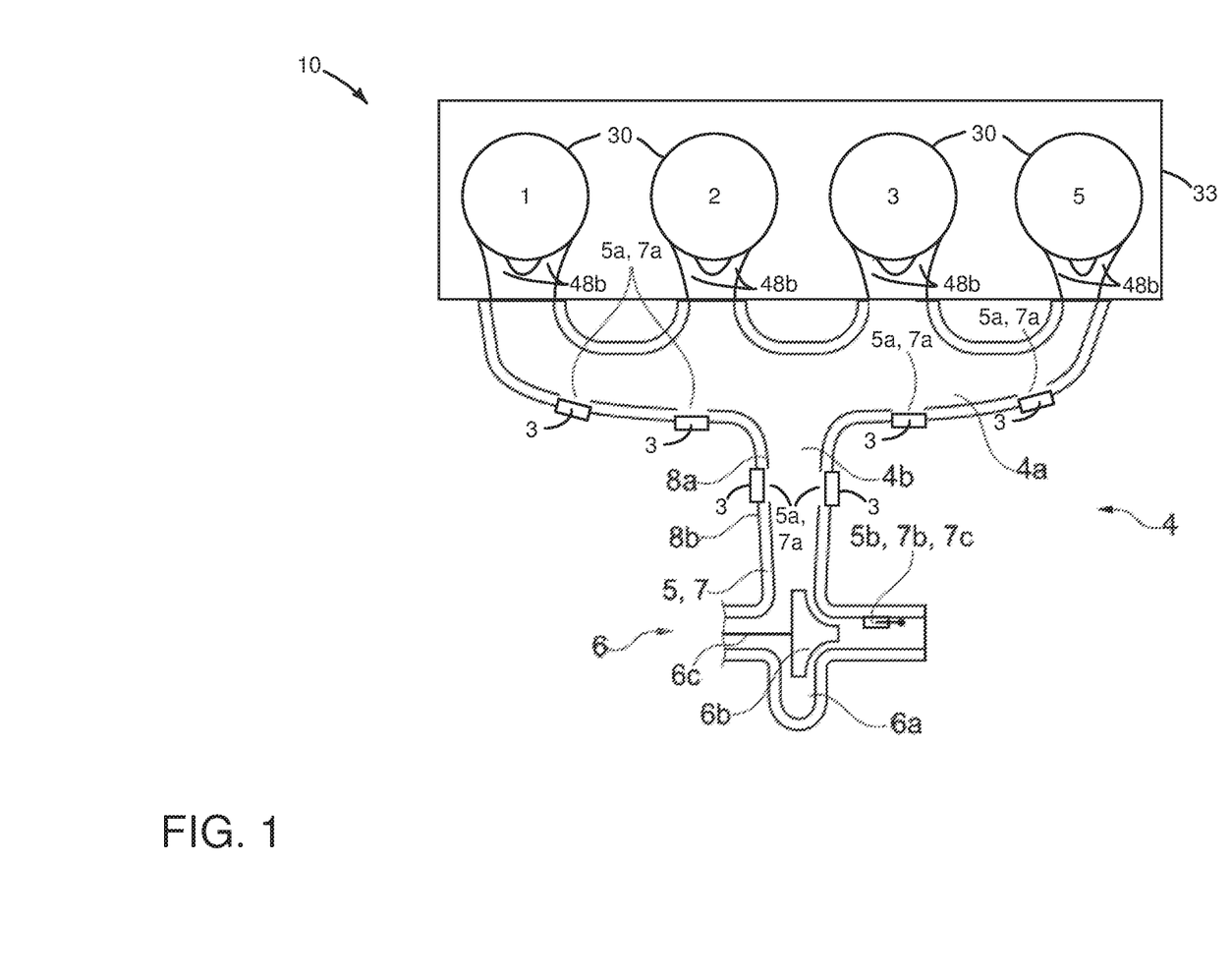
FIG. 1 shows a schematic diagram of an engine.
Figure 2:
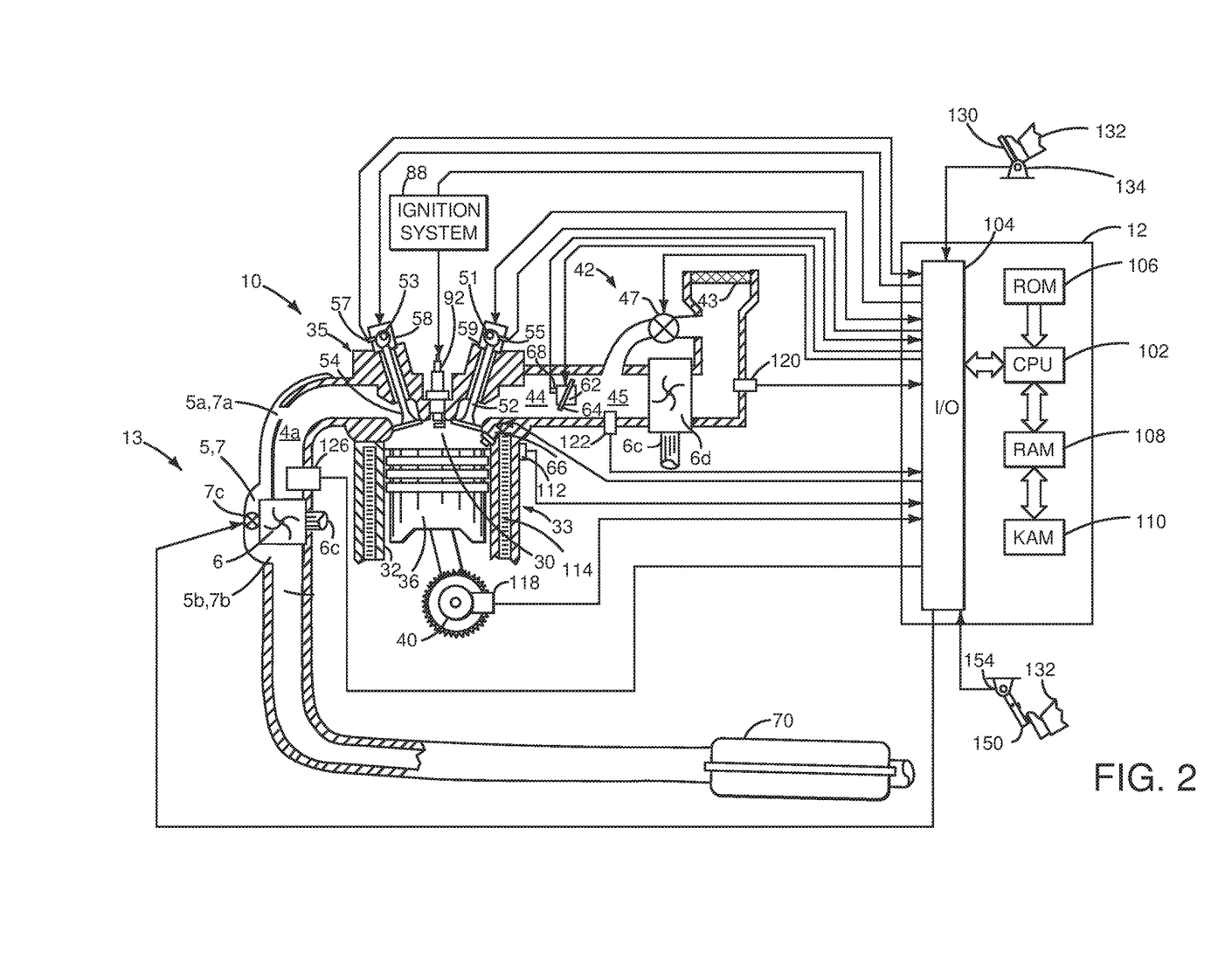
FIG. 2 shows a schematic diagram of an engine system that includes the engine of FIG. 1.
Figure 3:
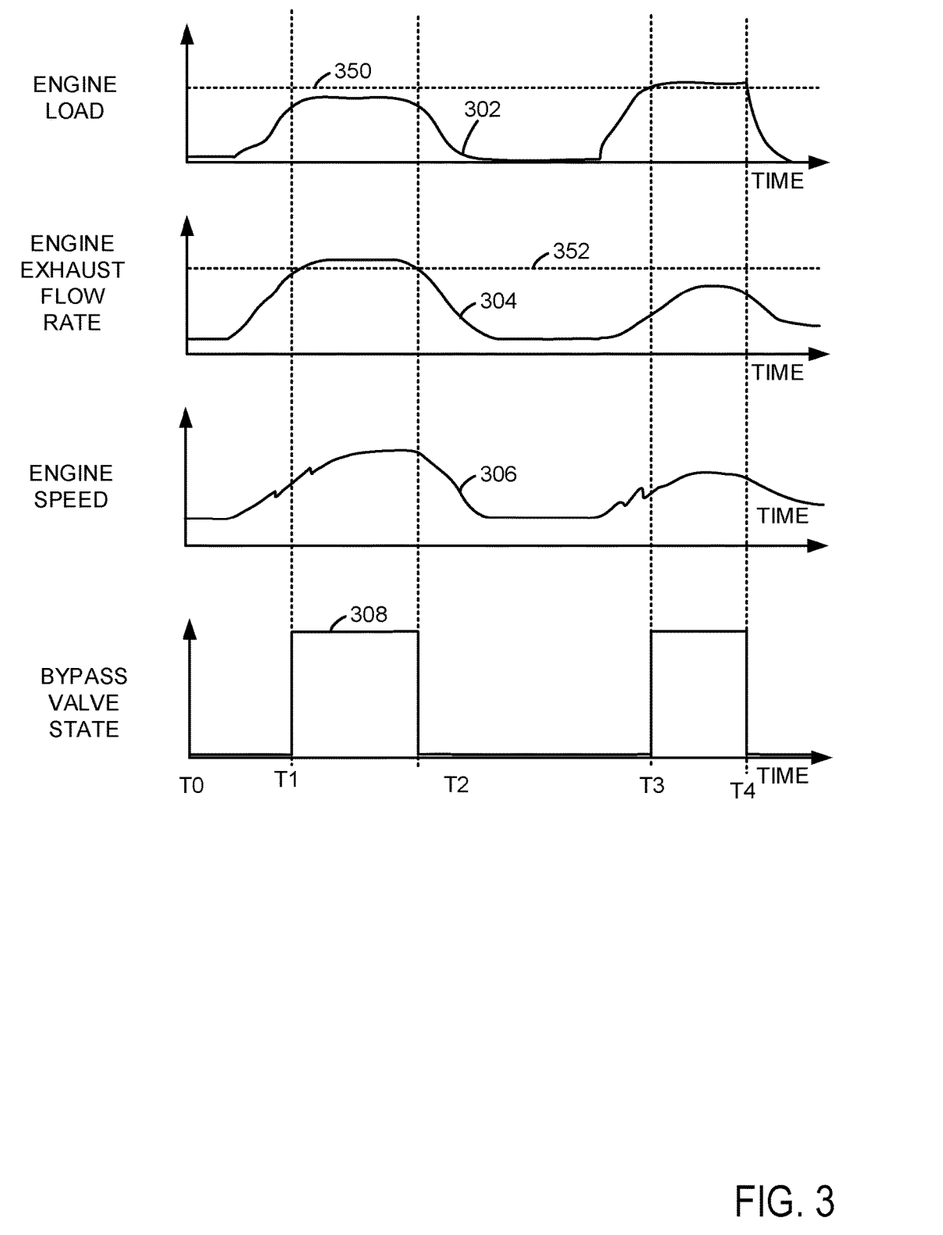
FIG. 3 shows an example vehicle operating sequence.

The present description is related to improving operation of a turbocharged engine. The engine may be configured as shown in FIG. 1. The engine may be included in a system as shown in FIG. 2. The engine and engine system may operate as is shown in FIG. 3. The system may be operated via a controller according to the method of FIG. 4.

Along with the already stated object, it is a further sub-object of the present invention to specify a method for operating a supercharged internal combustion engine of the stated type. The exhaust-gas discharge system of the internal combustion engine according to the invention is equipped with at least one cavity, which can be utilized, that is to say used, selectively and as required as thermal insulation or as a bypass or bypass line of the wastegate turbine. To be able to serve as a bypass for the wastegate turbine, the at least one cavity is at least connectable, that is to say is connectable for a limited time as required or is permanently connected, to the exhaust-gas discharge system upstream and downstream of the wastegate turbine. The at least one cavity which serves as a bypass line for the wastegate turbine is equipped with at least one shut-off element (e.g., a bypass valve), preferably downstream of the turbine in the mouth region of the cavity, in order for a bypass to be opened up, for the purposes of blowing off exhaust gas, by virtue of the shut-off element being opened, and to be shut off, by virtue of the shut-off element being closed.

The wastegate turbine according to the invention is designed for a predefinable exhaust-gas flow rate. If the exhaust-gas flow exceeds the predefinable exhaust-gas flow rate, a part of the exhaust-gas flow is, within the course of an exhaust-gas blow-off, conducted past the turbine via the bypass line, that is to say via at least one cavity.

The fact that the at least one cavity according to the invention can be utilized not only as a bypass for the turbine, but also, if required, as thermal insulation for the exhaust-gas discharge system, leads to particularly advantageous synergistic effects.

In the presence of low and medium exhaust-gas flow rates, that is to say at low and medium engine speeds and/or loads, at which no exhaust-gas blow-off is required and performed, the exhaust-gas temperatures are moderate or relatively low, such that a demand basically exists, or would exist, for thermal insulation. Owing to the absence of an exhaust-gas blow-off because the latter is not necessary, it is possible to dispense with a bypass for the turbine, and the at least one cavity can be utilized, in accordance with the demand that exists, as thermal insulation for the exhaust-gas discharge system. The exhaust gas or gas mixture that is introduced into the at least one cavity can be utilized as thermal insulation. The at least one gas cushion serves as a heat barrier, wherein the cavity may be closed or else open on one side.

Then, less heat is extracted from the exhaust gas as it flows through the exhaust-gas discharge system on the path to the turbine, as a result of which an exhaust gas which is richer in energy, that is to say an exhaust gas of higher exhaust-gas enthalpy, is provided, and exhaust-gas after treatment systems provided in the exhaust-gas discharge system downstream of the turbine reach their operating temperature, or a higher operating temperature, more quickly.

If it is then desired, with increasing exhaust-gas flow rate, for example at high loads or at full load, for exhaust gas to be conducted past the turbine, the at least one cavity is used, in accordance with the demand that exists, as a bypass line for an exhaust-gas blow-off. There is advantageously no demand for thermal insulation at this point in time. Rather, owing to the high exhaust-gas flow rates and high exhaust-gas temperatures, there is a risk of thermal overloading of the components provided in the exhaust-gas discharge system, and of the exhaust-gas discharge system itself. Thermal insulation would disadvantageously increase this risk. In some cases, it is possible according to the invention to dispense entirely with an enrichment (e.g., $\lambda<1$ where $\lambda$ is the engine air-fuel equivalence ratio) for the purposes of cooling the exhaust gas.

The at least one cavity according to the invention serves for improving the torque characteristic of the supercharged internal combustion engine and the acceleration of the warm-up of the internal combustion engine and of the exhaust-gas after treatment systems after a cold start and in the warm-up phase. In this respect, the cavity also serves for reducing the fuel consumption and reducing the pollutant emissions.

With the internal combustion engine according to the invention, the first object on which the invention is based is achieved, that is to say a supercharged internal combustion engine is provided, by means of which the disadvantages known from the prior art are eliminated and the operating behavior of which is improved.

Embodiments of the supercharged internal combustion engine are advantageous in which at least one exhaust-gas after treatment system is arranged in the exhaust-gas discharge system downstream of the wastegate turbine.

The at least one exhaust-gas after treatment system downstream of the turbine may be an oxidation catalytic converter, a three-way catalytic converter, a storage catalytic converter, a selective catalytic converter and/or a particle filter. It is also possible for a combination of two or more of the abovementioned exhaust-gas after treatment systems to be used.

Embodiments of the supercharged internal combustion engine are advantageous in which the at least one exhaust-gas after treatment system downstream of the turbines is a combined exhaust-gas after treatment system which comprises a selective catalytic converter and a particle filter.

In selective catalytic converters, reducing agent is introduced in targeted fashion into the exhaust gas for the purposes of selectively reducing the nitrogen oxides. As reducing agent, in addition to ammonia and urea, use may also be made of unburned hydrocarbons.

To reduce the emissions of soot particles, use may be made of regenerative particle filters which filter the soot particles out of the exhaust gas and store them, with the soot particles being burned off intermittently during the course of a regeneration of the filter. For the regeneration of the particle filter, high temperatures—approximately 550° C. without catalytic assistance—are required, which are reached generally only at high loads and high engine speeds during operation. To ensure a regeneration of the filter under all operating conditions, additional measures may be necessary.

Further advantageous embodiments of the internal combustion engine according to the invention will be discussed in conjunction with the subclaims. Embodiments of the supercharged internal combustion engine are advantageous in which the bypass is connectable, upstream of the wastegate turbine in the region of the exhaust manifold, via at least one inlet opening to the exhaust-gas discharge system, each inlet opening being equipped with a shut-off element. In the present case, the at least one cavity extends as far as into the region of the exhaust manifold and is connectable to the exhaust-gas discharge system in the region of the manifold as required. Each of the provided inlet openings is equipped with a shut-off element which, in an open position, opens up the associated inlet opening and which, in a closed position, shuts off or closes the inlet opening.

Embodiments of the supercharged internal combustion engine may also be advantageous in which the bypass is connectable, upstream of the wastegate turbine in the region of the overall exhaust line, via at least one inlet opening to the exhaust-gas discharge system, each inlet opening being equipped with a shut-off element. In the above embodiment, the at least one cavity can be connected to the exhaust-gas discharge system in the region of the overall exhaust line as required. As in the preceding embodiment, each inlet opening is equipped with a shut-off element. If the at least one cavity extends as far as into the region of the exhaust manifold, the cavity is generally of relatively large area and also relatively large volume, whereby the function as thermal insulation is advantageously enhanced.

Embodiments of the supercharged internal combustion engine may also be advantageous in which the bypass is connected, upstream of the wastegate turbine in the region of the exhaust manifold, via at least one inlet opening to the exhaust-gas discharge system. Embodiments of the supercharged internal combustion engine may likewise be advantageous in which the bypass is connected, upstream of the wastegate turbine in the region of the overall exhaust line, via at least one inlet opening to the exhaust-gas discharge system.

The two above embodiments of the internal combustion engine are distinguished by the fact that the at least one cavity is not connected to the exhaust-gas discharge system for a limited time as required, but rather is connected to the exhaust-gas discharge system permanently. Consequently, an inlet opening that is provided does not need to be equipped with a shut-off element (e.g., a bypass valve). The shut-off element is omitted. Embodiments of the supercharged internal combustion engine are advantageous in which the bypass has multiple inlet openings. The provision of multiple inlet openings facilitates the charging of the at least one cavity. Furthermore, the at least one cavity is equally easily accessible to the exhaust gas from all of the cylinders. Furthermore, it is possible for a more homogeneous temperature distribution in the cavity and a greater exhaust-gas throughput to be realized. In this context, embodiments of the supercharged internal combustion engine are advantageous in which multiple inlet openings of the bypass are arranged in uniformly distributed fashion in the region of the exhaust manifold. This assists the positive effects mentioned above.

Embodiments of the supercharged internal combustion engine are advantageous in which the at least one cavity is formed at least inter alia using shell elements arranged spaced apart from one another, inner shell elements forming a system which permanently conducts exhaust gas, and outer shell elements which are arranged spaced apart from the inner shell elements serving to form the at least one cavity. The exhaust-gas discharge system or the manifold is preferably not a cast part into which the at least one cavity is formed as an integral constituent part during the course of the casting process. Rather, the exhaust-gas discharge system is preferably an assembled system, composed for example of metal sheets, in the case of which the at least one cavity is formed during the assembly process using shell elements arranged spaced apart from one another. Cast parts may possibly be attached to the exhaust-gas discharge system, for example a cast flange for the fastening of the manifold to the cylinder head or the like. The at least one cavity can serve as thermal insulation or as a bypass, wherein the cavity may be closed or else open on one side.

Embodiments of the supercharged internal combustion engine are advantageous in which the exhaust-gas discharge system is, upstream of the wastegate turbine, equipped over at least 35% of its extent with at least one cavity which can be used as thermal insulation. Embodiments of the supercharged internal combustion engine are advantageous in which the exhaust-gas discharge system is, upstream of the wastegate turbine, equipped over at least 50% of its extent with at least one cavity which can be used as thermal insulation. Embodiments of the supercharged internal combustion engine may also be advantageous in which the exhaust-gas discharge system is, upstream of the wastegate turbine, equipped over at least 65% of its extent with at least one cavity which can be used as thermal insulation. Embodiments of the supercharged internal combustion engine may also be advantageous in which the exhaust-gas discharge system is, upstream of the wastegate turbine, equipped over at least 75% of its extent with at least one cavity which can be used as thermal insulation. Embodiments of the supercharged internal combustion engine may also be advantageous in which the exhaust-gas discharge system is, upstream of the wastegate turbine, equipped over at least 85% of its extent with at least one cavity which can be used as thermal insulation.

The larger the area over which the at least one cavity that can be used as thermal insulation extends around the exhaust-gas discharge system itself, that is to say the exhaust-gas-discharging system, the better or more effectively the at least one cavity can perform the function of thermal insulation. With regard to the use as a bypass or bypass line, the extent of the at least one cavity is not of great relevance, or has no relevance whatsoever. Embodiments of the supercharged internal combustion engine are advantageous in which the turbine housing of the wastegate turbine is equipped at least in regions with at least one cavity which can be used as thermal insulation.

To be able to serve as a bypass for the wastegate turbine, the at least one cavity must extend across the wastegate turbine, that is to say must extend from upstream of the turbine as far as downstream of the turbine. In the above embodiment, the at least one cavity is advantageously, and in sections, part of the turbine housing. Furthermore, the turbine housing may have further cavities which can be used as thermal insulation and which serve for insulating the housing as part of the exhaust-gas discharge system. Embodiments of the supercharged internal combustion engine are advantageous in which the bypass is at least connectable, downstream of the wastegate turbine, via at least one outlet opening to the exhaust-gas discharge system. Embodiments of the supercharged internal combustion engine may also be advantageous in which the bypass is at least connectable, downstream of the wastegate turbine, via multiple outlet openings to the exhaust-gas discharge system.

In this context, embodiments of the supercharged internal combustion engine are advantageous in which each outlet opening is equipped with a shut-off element. Embodiments of the supercharged internal combustion engine are advantageous in which a shut-off element can be electrically, hydraulically, pneumatically, mechanically or magnetically controlled, preferably by means of an engine controller. Embodiments of the supercharged internal combustion engine are advantageous in which the bypass opens into the exhaust-gas discharge system upstream of an exhaust-gas after treatment system provided in the exhaust-gas discharge system downstream of the turbines. Embodiments of the supercharged internal combustion engine are advantageous in which a charge-air cooler is provided in the intake system downstream of the compressor. Embodiments of the supercharged internal combustion engine are advantageous in which the wastegate turbine has a variable turbine geometry.

A variable turbine geometry increases the flexibility of the supercharging. It permits a continuous adaptation of the turbine geometry to the respective operating point of the internal combustion engine and to the present exhaust-gas mass flow. By contrast to a turbine with fixed geometry, it is possible to realize more or less satisfactory supercharging over a broad engine speed and load range. In particular, the combination of a turbine with variable turbine geometry and a bypass that bypasses the turbine makes it possible for the turbine to also be designed for very small exhaust-gas flows and thus for the lower part-load range. It is consequently possible to achieve high turbine pressure ratios even at low engine speeds and even in the case of very low exhaust-gas flow rates. Embodiments of the supercharged internal combustion engine are advantageous in which the exhaust lines of all of the cylinders merge, thus forming an exhaust manifold. The merging of exhaust lines yields a compact construction of the exhaust-gas discharge system, wherein the overall length of the exhaust lines is shortened, and the volume is reduced. This reduces the thermal inertia of the exhaust-gas discharge system as far as the turbine, such that exhaust gas which is richer in energy is available at the inlet into the turbine. The overall efficiency of the internal combustion engine likewise increases here.

Embodiments of the supercharged internal combustion engine are advantageous in which the turbine housing of the turbine is at least partially formed integrally with the exhaust manifold. That part of the turbine housing which is formed integrally with the manifold may serve as a mounting or fastening for the exhaust-gas turbocharger, wherein a pre-assembled unit comprising the compressor, the bearing housing and the turbine rotor can be inserted into that part of the turbine housing which is formed integrally with the manifold. In this respect, the turbine housing of the turbine may also be a housing which is partially formed integrally with the exhaust manifold and which is partially cast, wherein the parts of the housing are connected to one another during the assembly process.

The second sub-object on which the invention is based, specifically that of specifying a method for operating a supercharged internal combustion engine of a type described above, is achieved by means of a method which is distinguished by the fact that the at least one cavity is utilized as a bypass in order to conduct exhaust gas past the wastegate turbine. That which has been stated in connection with the internal combustion engine according to the invention likewise applies to the method according to the invention. Method variants are advantageous in which the at least one cavity is utilized as a bypass if the exhaust-gas flow rate exceeds a predefinable exhaust-gas flow rate. Method variants are advantageous in which the at least one cavity is utilized as a bypass if the exhaust-gas energy exceeds a predefinable level of exhaust-gas energy. Method variants are advantageous in which the at least one cavity is utilized as a bypass if the load exceeds a predefinable load. Method variants are advantageous in which the at least one cavity is used as thermal insulation if no demand exists for bypassing of the wastegate turbine via the bypass.

The invention will be described in more detail below on the basis of an exemplary embodiment according to FIG. 1. FIG. 1 schematically shows a section of the exhaust-gas discharge system of a first embodiment of the supercharged internal combustion engine together with wastegate turbine. FIG. 1 schematically shows a section of the exhaust-gas discharge system 4 of a first embodiment of the supercharged internal combustion engine 10 together with wastegate turbine 6.

The exhaust-gas discharge system 4 is that of a four-cylinder in-line engine 10 and serves for discharging the exhaust gases from the cylinders 30. Discussed herein, cylinders 30 may also be referred to as combustion chambers 30. The four cylinders 30 of the internal combustion engine 10 are arranged in a line along the longitudinal axis of the cylinder head and numbered 1-4. The exhaust lines 48b of the cylinders 30 merge to form an overall exhaust line 4b, thus forming an exhaust manifold 4a, whereby all of the exhaust lines are connected to one another, and the same exhaust-gas pressure prevails in all exhaust lines. Exhaust manifold 4a may be bolted to cylinder block 33 or cast within cylinder block 33.

The internal combustion engine 10 has an intake system 42 (shown in FIG. 2) for supplying the charge air to the cylinders 30 and is, for the purposes of supercharging, equipped with an exhaust-gas turbocharger which comprises a turbine 6 arranged in the overall exhaust line 4b and a compressor 6d arranged in the intake system 42 as shown in FIG. 2, wherein the turbine 6 comprises an impeller 6b mounted in a turbine housing 6a on a rotatable shaft 6c and is in the form of a wastegate turbine 6, that is to say is equipped with a bypass 7 for the purposes of bypassing the impeller 6b.

The exhaust-gas discharge system 4 is equipped with a cavity 5. In the embodiment illustrated in FIG. 1, the cavity 5 is formed using shell elements 8a, 8b arranged spaced apart from one another, inner shell elements 8a (or wall) forming a system which permanently conducts exhaust gas, and outer shell elements 8b (or wall) which are arranged spaced apart from the inner shell elements 8a serving to form the cavity 5. The exhaust-gas discharge system 4 upstream of the wastegate turbine 6 and the turbine housing 6a are encased over a large area by the cavity 5 which can be used as thermal insulation, which cavity also forms the bypass 7 for the wastegate turbine 6.

To be able to serve as a bypass 7 for the wastegate turbine 6, the cavity 5 extends across the turbine 6. The bypass 7 or cavity 5 is connected to the exhaust-gas discharge system 4 upstream of the wastegate turbine 6 in the region of the exhaust manifold 4a via multiple inlet openings 5a, 7a, wherein the inlet openings 5 a, 7a are arranged in uniformly distributed fashion in the region of the exhaust manifold 4a and/or overall exhaust line 4b. The bypass 7 or cavity 5 opens into the exhaust-gas discharge system 4 downstream of the wastegate turbine 6 via an outlet opening 5b, 7b and is connectable to the exhaust-gas discharge system 4 via outlet opening 5b, 7b by virtue of a shut-off element 7c being opened. The illustrated wastegate turbine 6 is designed for a predefinable exhaust-gas flow rate. If the exhaust-gas flow exceeds the predefinable exhaust-gas flow rate, a part of the exhaust-gas flow is, within the course of an exhaust-gas blow-off, conducted past the turbine 6 via the bypass 7, that is to say via the cavity 5. Alternatively, or in addition, optional inlet shut-off devices (or inlet control valves) 3 may be selectively and independently opened and closed to allow exhaust flow into cavity 5. In one example, a first inlet shut-off valve may be opened at a first exhaust flow rate, and then a second inlet shut-off valve may be opened at a second exhaust flow rate, and so on, to relieve exhaust pressure upstream of turbine 6.

The cavity 5 not only serves as a bypass 7 for the turbine 6 but is also, as required, used as thermal insulation for the exhaust-gas discharge system 4. If no exhaust-gas blow-off is necessary, there is no demand for the cavity 5 to be utilized as a bypass 7. Then, the cavity 5 can be utilized as thermal insulation for the exhaust-gas discharge system 4. The exhaust gas introduced into the cavity 5 via inlet openings 5a serves as a heat barrier, wherein, in the present case, the cavity 5 is or remains open on one side. It is then the case that the exhaust gas for discharging has less heat extracted from it as it flows, on the path to the turbine 6, through the exhaust-gas discharge system 4, which is formed by the inner shell elements 8a and permanently conducts exhaust gas.

Referring to FIG. 2, internal combustion engine 10, comprising a plurality of cylinders, one cylinder of which is shown in FIG. 2, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Combustion chamber 30 is shown communicating with intake manifold 44 and exhaust manifold 4a via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices. Exhaust flows from cylinder head 35 to after treatment device 70 via exhaust system 13, which may include exhaust manifold 4a, turbine 6, valve 7c, after treatment device 70 and associated piping.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 6d and engine air intake 42. In other examples, compressor 6d may be a supercharger compressor. Shaft 6c mechanically couples turbocharger turbine 6 to turbocharger compressor 6d. Optional electronic throttle 62 adjusts a position of throttle plate 64 to control air flow from compressor 6d to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Bypass valve 7c may be adjusted via controller 12 to allow exhaust gases to selectively bypass turbine 6 to control the speed of compressor 6d. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter or after treatment device 70. Alternatively, a two-state exhaust gas oxygen sensor may be substituted for UEGO sensor 126.

As previously mentioned after treatment device or converter 70 can include multiple catalyst bricks, in one example. In another example, multiple emission control devices, each with multiple bricks, can be used. Converter 70 can be a three-way type catalyst in one example, particulate filter, selective catalytic converter, or oxidation catalyst.

Controller 12 is shown in FIG. 2 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by human 132; a position sensor 154 coupled to brake pedal 150 for sensing force applied by human 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g., when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g., when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 3, an example operating sequence is shown. The sequence of FIG. 3 may be provided by the system of FIGS. 1 and 2 according to the method of FIG. 4. The plots shown in FIG. 3 are aligned in time. Vertical markers T0-T4 represent times of particular interest in the sequence.

The first plot from the top of FIG. 3 is a plot of engine load versus time. The vertical axis represents engine load and engine load increases in the direction of the vertical axis arrow. Trace 302 represents engine load and engine load values may vary between zero and one. The horizontal axis represents time and time increases from the left side of the plot to the right side of the plot. Horizontal line 350 represents a threshold engine load above which the turbocharger bypass valve opens and allows exhaust to pass from a cavity in an exhaust manifold to a location in an exhaust system downstream of a turbocharger turbine.

The second plot from the top of FIG. 3 is a plot of engine exhaust flow rate versus time. The vertical axis represents engine exhaust flow rate and engine exhaust flow rate increases in the direction of the vertical axis arrow. Trace 304 represents engine exhaust flow rate. The horizontal axis represents time and time increases from the left side of the plot to the right side of the plot. Horizontal line 352 represents a threshold engine exhaust flow rate above which the turbocharger bypass valve opens and allows exhaust to pass from a cavity in an exhaust manifold to a location in an exhaust system downstream of a turbocharger turbine.

The third plot from the top of FIG. 3 is a plot of engine speed versus time. The vertical axis represents engine speed and engine speed increases in the direction of the vertical axis arrow. The horizontal axis represents time and time increases from the left side of the plot to the right side of the plot. Trace 306 represents engine speed.

The fourth plot from the top of FIG. 3 is a plot of bypass valve state versus time. The vertical axis represents an operating state of bypass valve 7c shown in FIGS. 1 and 2. The bypass valve is open when the trace 308 is at a higher level near the vertical axis arrow. The bypass valve is closed when trace 308 is at a lower level near the horizontal axis. The horizontal axis represents time and time increases from the left side of the plot to the right side of the plot.

At time T0, the engine load is low and engine speed is also low. The engine exhaust flow rate is low and the bypass valve is closed. The bypass valve is closed at low engine loads and low exhaust flow rates to allow engine exhaust energy to rotate the turbocharger turbine.

Between time T0 and time T1, the engine load and engine speed increase. The engine load and engine speed may increase in response to a vehicle driver applying an accelerator pedal (not shown). The engine exhaust flow rate increases as the engine load and engine speed increase. The bypass valve remains in a closed state.

At time T1, the engine exhaust flow rate exceeds threshold 304 and the bypass valve is opened in response to the engine exhaust flow rate exceeding threshold 304. In this particular instance, the engine speed is at a higher level which contributes to the higher exhaust flow rate. Consequently, the bypass valve switches state in response to the exhaust flow rate before the engine load exceeds threshold 302. By opening the bypass valve, excess exhaust flow is directed around the turbocharger turbine to reduce the possibility of turbine temperatures that are higher than is desired.

Between time T1 and time T2, the engine exhaust flow rate remains at a higher level because engine speed is relatively high. The engine load remains below threshold 302 and the bypass valve remains open.

At time T2, the engine exhaust flow rate is reduced to less than threshold 304 by reducing engine load and speed. The engine load and speed may be reduced via the vehicle operator releasing the accelerator pedal (not shown). The bypass valve is closed in response to the exhaust flow rate being less than threshold 304.

Between time T2 and time T3, the engine load is reduced to a low level and engine speed is reduced to idle speed. The exhaust flow rate is reduced as engine load and speed are reduced. The bypass valve remains closed as the engine load and speed are reduced. Near time T3 the engine load and speed begin to increase in response to a driver applying an accelerator pedal (now shown).

At time T3, the engine load exceeds threshold 302 without the engine exhaust flow rate exceeding threshold 304. Such conditions may be present when a vehicle's transmission is operated in a higher gear and the driver applies the accelerator pedal. The bypass valve is opened in response to the engine load exceeding threshold 302. The engine speed is at a middle level.

Between time T3 and time T4, the engine load stabilizes to a level just above threshold 302 and engine speed also levels off. The exhaust flow rate increases and then levels off to a level below threshold 304. Engine speed increases and then levels off. The bypass valve remains in an open state.

At time T4, the driver releases the accelerator pedal (not shown) and the engine load is reduced in response to the accelerator pedal being released. The bypass valve is closed in response to engine load being reduced to less than threshold 302. Engine exhaust flow decreases and engine speed decrease in response to reducing the engine load.

In this way, the bypass valve state may open and close responsive to engine load exceeding or being less than a threshold. Further, the bypass valve state may open and close responsive to engine exhaust flow rate exceeding or being less than a threshold.

Figure 4:
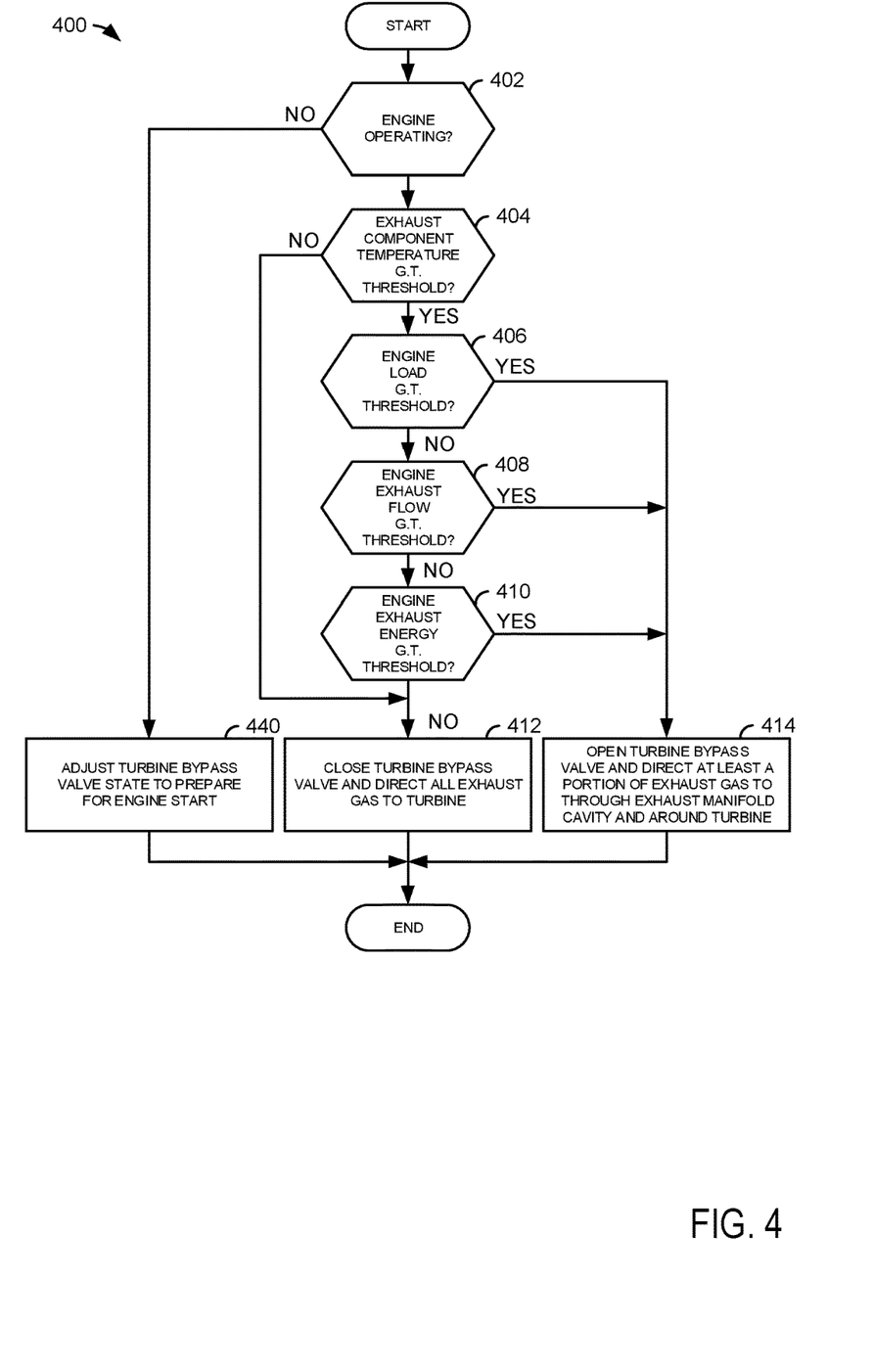
FIG. 4 shows an example method for operating a vehicle driveline.

Referring now to FIG. 4, a method for operating a bypass valve (e.g., 7c) as shown in FIGS. 1 and 2 is shown. At least portions of method 400 may be implemented as executable controller instructions stored in non-transitory memory. Additionally, portions of method 400 may be actions taken in the physical world to transform an operating state of an actuator or device.

At 402, method 400 judges if the engine is operating and combusting air and fuel. In one example, method 400 may judge that the engine is operating and combusting air and fuel if engine speed is greater than a threshold speed (e.g., engine cranking speed). If so, the answer is yes and method 400 proceeds to 404. Otherwise, the answer is no and method 400 proceeds to 440.

At 440, method 400 adjusts the state of the bypass valve (e.g., 7c in FIGS. 1 and 2) to prepare for an engine start. In some examples, the bypass valve may be closed so that exhaust gas remains in the cavity in the exhaust manifold so that thermal energy in exhaust gas may be maintained as exhaust gas flows through the exhaust manifold so that the after treatment device may warm faster to improve its efficiency. Method 400 proceeds to exit.

At 404, method 400 judges if an exhaust system component (e.g., after treatment device) temperature is greater than a threshold. In one example, the threshold may be an after treatment device temperature where after treatment device efficiency is greater than 50%. If method 400 judges that after treatment device temperature exceeds the threshold, the answer is yes and method 400 proceeds to 406. Otherwise, the answer is no and method 400 proceeds to 412. Thus, for after treatment device temperatures less than a threshold, the bypass valve may be held closed to retain exhaust gas in the cavity, thereby reducing after treatment device warm up time during engine cold starts. On the other hand, during warm engine starts, the bypass valve may be opened if conditions such as engine load exceeding a threshold are met.

At 406, method 400 judges if engine load is greater than a threshold. In one example, the threshold may be an engine load may be an engine load where temperature in the cylinder exceeds a threshold. In other examples, the threshold may be based on an amount of mass (e.g., air and fuel mass) in the cylinder at the engine load. If method 400 judges that engine load exceeds the threshold, the answer is yes and method 400 proceeds to 414. Otherwise, the answer is no and method 400 proceeds to 408.

At 408, method 400 judges if engine exhaust flow rate is greater than a threshold. In one example, the threshold may be an engine exhaust flow rate where flow through the turbocharger turbine produces a pressure ratio across the turbine that exceeds a predetermined value (e.g., 2.2). If method 400 judges that engine exhaust flow rate exceeds the threshold, the answer is yes and method 400 proceeds to 414. Otherwise, the answer is no and method 400 proceeds to 410.

At 410, method 400 judges if engine exhaust energy is greater than a threshold. In one example, the engine exhaust energy threshold may be an engine exhaust energy amount that begins to cause degradation of exhaust components (e.g., a turbine impeller). In other examples, the threshold may be an amount of exhaust energy that causes turbocharger turbine speed to reach a rated turbine speed. If method 400 judges that engine exhaust energy amount exceeds the threshold, the answer is yes and method 400 proceeds to 414. Otherwise, the answer is no and method 400 proceeds to 412.

At 412, method 400 closes the bypass valve so that all exhaust gas, except exhaust gas in the exhaust manifold cavity, is directed to the turbocharger turbine. By closing the bypass valve, energy in the exhaust gas may be retained and turbocharger efficiency may be improved. The exhaust energy may be retained by exhaust gas being held within the cavity. Method 400 proceeds to exit.

At 414, method 400 opens the bypass valve so that at least a portion of engine exhaust is directed through the exhaust manifold cavity and around the turbine without flowing through the turbine. Opening the bypass valve lowers exhaust pressure upstream of the turbine in the direction of exhaust flow from the engine to the turbocharger turbine. Method 400 proceeds to exit.

In this way, engine exhaust may be directed through a cavity in an exhaust manifold during higher engine speeds and loads to reduce engine exhaust pressure and turbine speed. The engine exhaust may be directed to a turbocharger turbine at lower engine speeds to retain energy in engine exhaust and improve turbocharger efficiency. A bypass valve state may be adjusted to allow exhaust gas to flow through the cavity or remain in the cavity.

REFERENCE DESIGNATIONS

1 Supercharged internal combustion engine, four-cylinder in-line engine
30 Cylinder
4 Exhaust-gas discharge system
4a Exhaust manifold
4b Overall exhaust line
5 Cavity
5a Inlet opening
5b Outlet opening
6 Turbine, wastegate turbine
6a Turbine housing
6b Turbine impeller
6c Turbine shaft
7 Bypass, bypass line
7a Inlet opening, branching point
7b Outlet opening, opening-in point
7c Shut-off element
8a Inner shell elements
8b Outer shell elements Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, hybrid electric vehicles including engines operating in natural gas, gasoline, diesel, or alternative fuel configurations could use the present description to advantage.

The invention claimed is:

1. A supercharged internal combustion engine comprising:
    at least two cylinders;
    an intake system for supply of charge air;
    an exhaust-gas discharge system for discharge of exhaust gas; and
    at least one exhaust-gas turbocharger including a turbine arranged in the exhaust-gas discharge system and a compressor arranged in the intake system;
        wherein each of the at least two cylinders has at least one outlet opening for the discharge of the exhaust gases via the exhaust-gas discharge system, and the at least one outlet opening is adjoined by an exhaust line;
        wherein the exhaust line of said each of the at least two cylinders merges to form an overall exhaust line, thus forming an exhaust manifold; and
        wherein the turbine of the at least one exhaust-gas turbocharger comprises a wastegate turbine positioned in a turbine housing;
        wherein the exhaust-gas discharge system is equipped with at least one cavity for use as thermal insulation;
        wherein the at least one cavity forms a connected to the exhaust-gas discharge system from upstream of the wastegate turbine and downstream of the wastegate turbine; and
        wherein at least one bypass valve is positioned in the bypass.

2. The supercharged internal combustion engine of claim 1, wherein the bypass is connected to the exhaust-gas discharge system upstream of the wastegate turbine in a region of the exhaust manifold, via at least one inlet opening to the exhaust-gas discharge system, the et least one inlet opening being equipped with an inlet control valve.

3. The supercharged internal combustion engine of claim 2, wherein the bypass is connected to the exhaust-gas discharge system upstream of the wastegate turbine in a region of the overall exhaust line, via at least one inlet opening to the exhaust-gas discharge system, the at least one inlet opening being equipped with the inlet control valve.

4. The supercharged internal combustion engine of claim 1, wherein the bypass is connected to the exhaust-gas discharge system upstream of the wastegate turbine in a region of the exhaust manifold, via at least one inlet opening to the exhaust-gas discharge system.

5. The supercharged internal combustion engine of claim 1, wherein the bypass is connected to the exhaust-gas discharge system upstream of the wastegate turbine in a region of the overall exhaust line, via at least one inlet opening to the exhaust-gas discharge system.

6. The supercharged internal combustion engine of claim 1, wherein the bypass has multiple inlet openings.

7. The supercharged internal combustion engine of claim 6, wherein multiple inlet openings of the bypass are arranged in a uniformly distributed fashion in a region of the exhaust manifold.

8. The supercharged internal combustion engine of claim 1, wherein the at least one cavity is formed at least inter alia using shell elements arranged spaced apart from one another, inner shell elements forming a system which permanently conducts exhaust gas, and outer shell elements which are arranged spaced apart from the inner shell elements serving to form the at least one cavity.

9. The supercharged internal combustion engine of claim 1, wherein the at least one cavity encases at least 50% of the exhaust-gas discharge system upstream of the wastegate turbine.

10. The supercharged internal combustion engine of claim 1, wherein the at least one cavity encases at least 65% of the exhaust-gas discharge system upstream of the wastegate turbine.

11. The supercharged internal combustion engine of claim 1, wherein the at least one cavity encases at least 75% of the exhaust-gas discharge system upstream of the wastegate turbine.

12. An internal combustion engine, comprising:
    a cylinder block;
    an exhaust manifold including a first cavity located between an exterior wall of the exhaust manifold and an interior wall of the exhaust manifold;
    a turbocharger coupled to the exhaust manifold and including a second cavity to bypass a turbine of the turbocharger, the second cavity including a bypass valve; and
    a controller with executable instructions stored in non-transitory memory to open and close the bypass valve to enable and disable exhaust flow through the first and second cavities and around the turbine.

13. An engine operating method, comprising:
    adjusting a bypass valve to open or close a cavity in an engine exhaust manifold via a controller in response to an indication of a change in an operating condition of an engine related to at least one of an engine load, an engine exhaust mass flow rate, and an engine exhaust energy being received at the controller;
        wherein the cavity is located between an exhaust manifold exterior wall and an exhaust manifold interior wall; and
        wherein the cavity includes a plurality of inlets to the cavity upstream of a wastegate turbine and an outlet downstream of the wastegate turbine.

14. The method of claim 13, wherein the change in the operating condition of the engine includes the engine load exceeding a threshold load as determined by the controller based on an air mass entering the engine; and
    wherein the bypass valve is opened via the controller when the engine load exceeds the threshold load.

15. The method of claim 13, wherein the change in the operating condition of the engine includes the engine exhaust mass flow rate exceeding a threshold flow rate as determined by the controller based on a pressure ratio across the wastegate turbine; and     wherein the bypass valve is opened via the controller when the engine exhaust mass flow rate exceeds the threshold flow rate.

16. The method of claim 13, wherein the change in the operating condition of the engine includes the engine exhaust energy exceeding a threshold amount of energy as determined by the controller based on a speed of the wastegate turbine; and     wherein the bypass valve is opened via the controller when the engine exhaust energy exceeds the threshold amount of energy.

17. The method of claim 13, wherein the change in the operating condition of the engine includes the engine load being less than a threshold load as determined by the controller based on an air mass entering the engine; and     wherein the bypass valve is closed when the engine load is less than the threshold load.

\* \* \* \* \*